United States Patent
Zami et al.

(10) Patent No.: US 7,672,587 B2
(45) Date of Patent: Mar. 2, 2010

(54) RECONFIGURABLE SEMITRANSPARENT OPTICAL SWITCHING DEVICE

(75) Inventors: Thierry Zami, Massy (FR); Pierre Peloso, Villebon sur Yvette (FR)

(73) Assignee: Alcatel, Paris (FR)

( * ) Notice: Subject to any disclaimer, the term of this patent is extended or adjusted under 35 U.S.C. 154(b) by 1099 days.

(21) Appl. No.: 11/312,779

(22) Filed: Dec. 21, 2005

(65) Prior Publication Data

US 2006/0132174 A1      Jun. 22, 2006

(30) Foreign Application Priority Data

Dec. 22, 2004   (FR) .................................. 04 53147

(51) Int. Cl.
*H04J 14/00* (2006.01)
(52) U.S. Cl. .......................................... 398/50; 398/49
(58) Field of Classification Search ............. 398/48–50, 398/55, 56
See application file for complete search history.

(56) References Cited

U.S. PATENT DOCUMENTS

| | | | | |
|---|---|---|---|---|
| 5,194,977 | A * | 3/1993 | Nishio ........................ | 398/48 |
| 5,889,600 | A * | 3/1999 | McGuire ..................... | 398/50 |
| 7,010,266 | B2 * | 3/2006 | Hudson et al. ............. | 455/13.4 |
| 2002/0197000 | A1 * | 12/2002 | Marom ........................ | 385/17 |
| 2005/0117902 | A1 * | 6/2005 | Le Sauze et al. .............. | 398/45 |

OTHER PUBLICATIONS

Teck Yoong Chai et al, "Crosstalk Analysis for Limited-Wavelength-Interchanging Cross Connects", IEEE Photonics Technology Letters, IEEE, Inc., New York, US, vol. 14, No. 5, May 2002, pp. 2696-2698, XP001116427.
Xueli 1Hou et al, "Design of wavelength-comvertible optical switches for the all-optical next-generation Internet", High Performance Switching and Routing, 2001 IEEE Workshop on May 29-31, 1001, Piscataway, NJ, May 29, 2001, pp. 97-101, XP010542779.
P. Oehlen, "Noise and Crosstalk Limitations in Optical Cross-Connects with Reshaping Wavelength Converters", Journal of Lightwave Technology, IEEE, New York, US, vol. 17, No. 8 Aug. 1999, pp. 1294-1301, XP000919570.

* cited by examiner

*Primary Examiner*—Nathan M Curs
(74) *Attorney, Agent, or Firm*—Carmen Patti Law Group, LLC

(57) ABSTRACT

An optical switching device is provided. The device includes an input stage (1) comprising broadcast modules (MD1-MD3) that provide duplicates of the same multiplex, an output stage (2) comprising programmable multiplexer modules (OWS1-OWS3) having inputs associated with respective broadcast modules, and an intermediate stage (3) connecting each programmable multiplexer module input that is associated with a broadcast module to an output of the associated broadcast module. Each broadcast module includes a programmable demultiplexer module (IWS1-IWS3) having a transit output (B1), and a selection output (B2) and a star coupler (SC1-SC3). The transit output (B1) is connected to a first input (C1) of the coupler and an input and an output of a processing device (RG, RG') are respectively connected to a selection output (B2) and to a second input (C2) of the coupler.

9 Claims, 2 Drawing Sheets

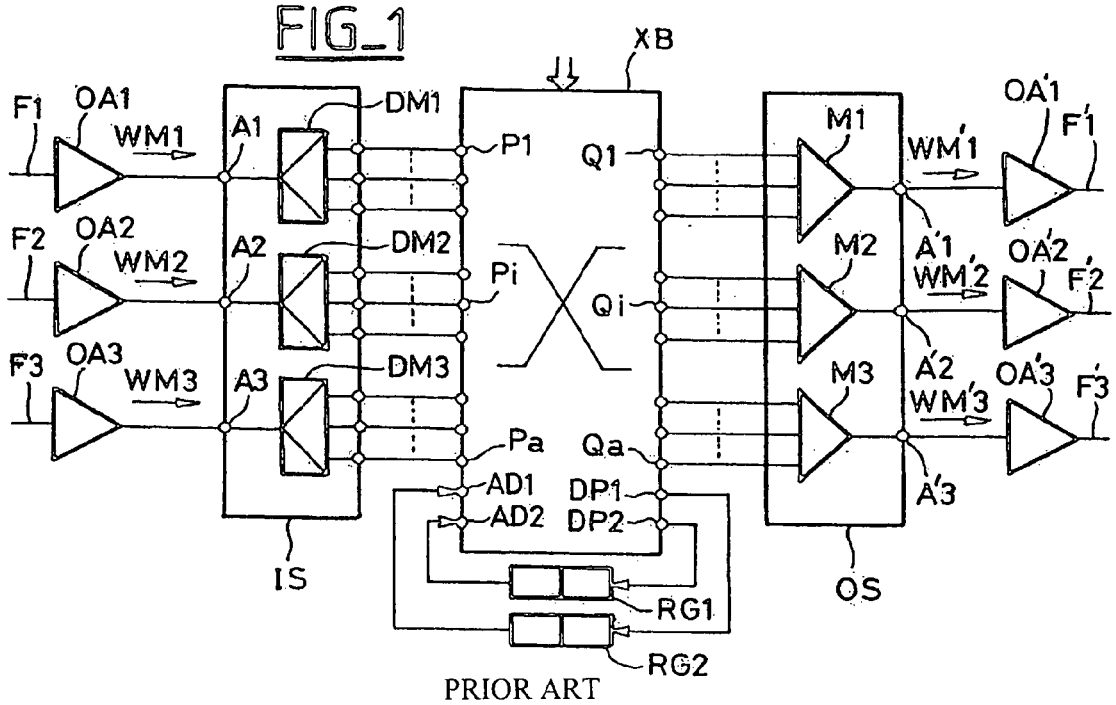
PRIOR ART
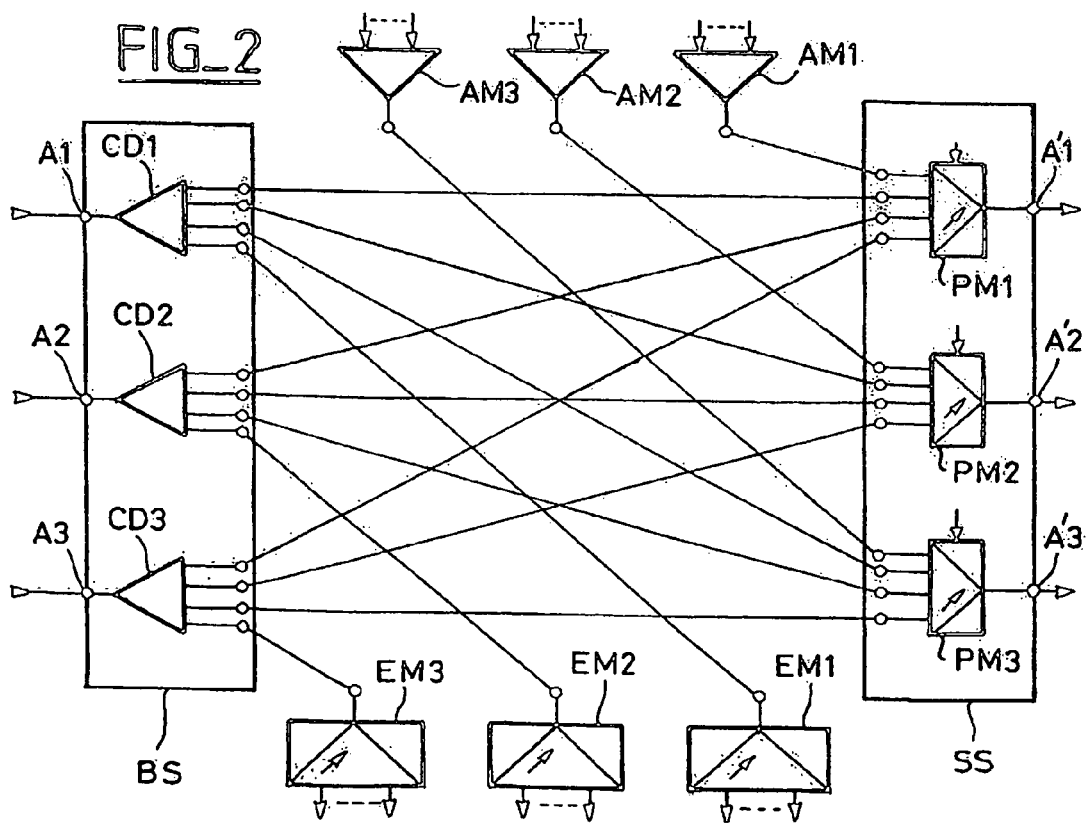
PRIOR ART

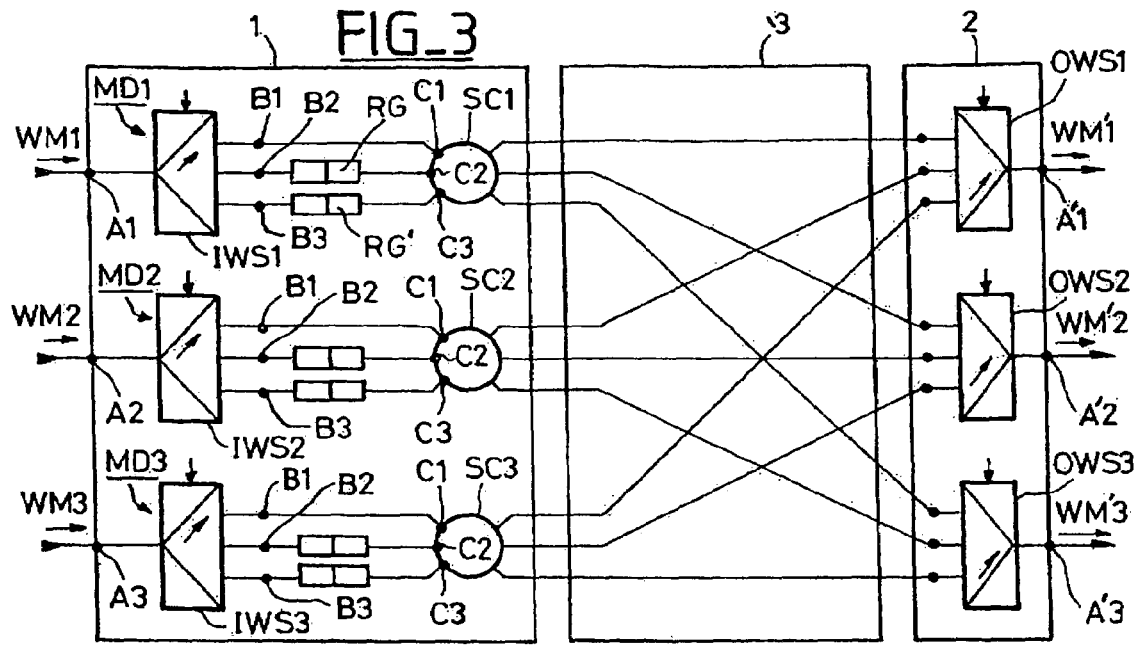
FIG_3
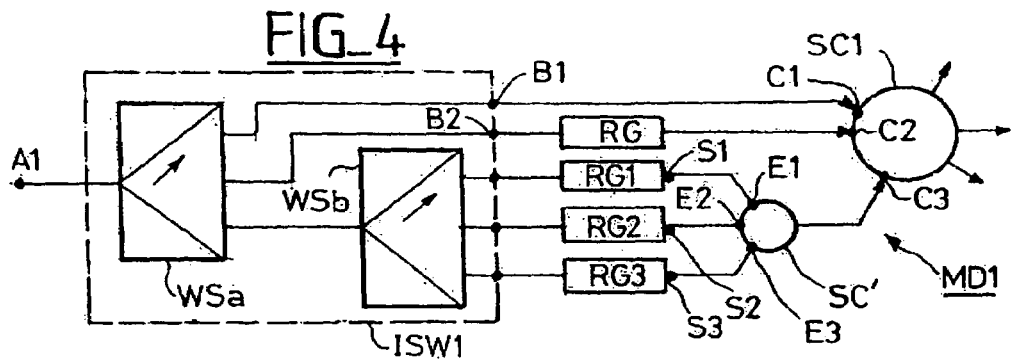
FIG_4
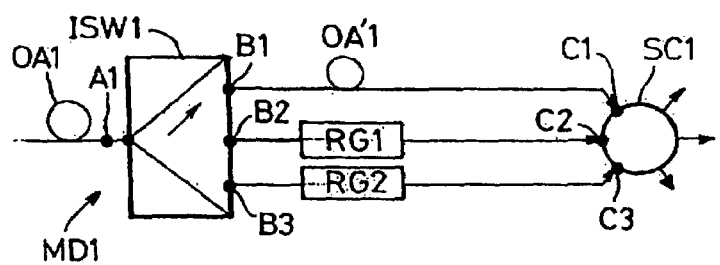
FIG_5
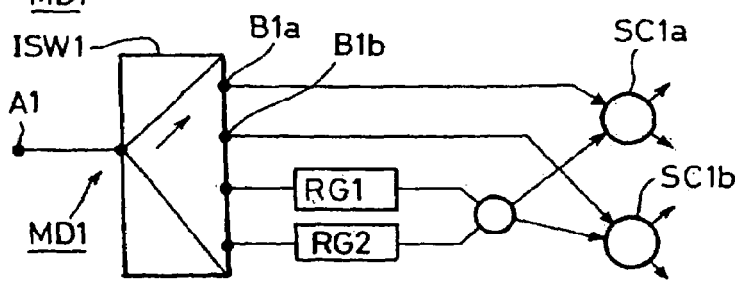
FIG_6

RECONFIGURABLE SEMITRANSPARENT OPTICAL SWITCHING DEVICE

The field of the invention is that of wavelength division multiplex optical transmission networks. The invention relates to optical switching devices that can be used in the routing nodes of such networks.

The invention relates more particularly to reconfigurable optical switches which receive wavelength division multiplex (WDM) signals via input ports and switch the channels (or, to put it more simply, the wavelengths) constituting the received WDM signals individually to respective output ports selected as a function of a control signal. The channels switched to the same output port are combined to form an output multiplex signal at that port.

The nodes of WDM networks may be equipped with regenerators operating separately on each channel of the received wavelength division multiplexes to reshape and resynchronize the optical signals before they are forwarded to other nodes. The network is then referred to as "opaque" and has the advantage that it can assure a transmission quality at least equal to a minimum level fixed for all the routes that the various channels can take. On the other hand, the presence of the regenerators has an impact on the cost of the nodes of the network, which increases in proportion to the number of WDM channels.

A less costly solution is to design a network in which the nodes have no individual channel regenerators. This kind of network is referred to as "transparent" and may nevertheless include optical amplifiers for simultaneously amplifying all the channels of the transmitted wavelength division multiplexes. However, that solution is suitable only for relatively small networks. A compromise is to provide a "hybrid" network in which either only certain nodes or links are provided with regenerators or nodes are provided with fewer regenerators than the number of received channels, which are used selectively as and when required. This hybrid solution is both flexible and economical. The nodes are then referred to as "semitransparent".

To produce a semitransparent node of the above kind, it is necessary to use a switch able to select dynamically which received WDM channels are be dropped and to which regeneration, or more generally individual processing, is to be applied. The switch must also be able thereafter to re-insert the processed channels, switching them to their respective destination output ports.

One common solution to performing the above operations exploits the fact that the switches generally integrate reconfigurable channel add and drop functions. These functions are provided to enable selective sending and receiving of signals by the node. Accordingly, to enable selective regeneration with this kind of switch, it suffices to reserve a few add and drop ports for this function and to provide regenerator means having inputs connected to respective reserved drop ports and outputs connected to respective add ports. The regenerator means can take various forms, for example involving conversion into the electrical domain, but in order to simplify network management it must be possible to tune their wavelength so that the added regenerated signals are carried by predefined wavelengths, generally those of the signals before they are regenerated.

Accordingly, to regenerate a selected channel of a selected input multiplex, the switch is configured to drop this channel from its input multiplex and switch it to one of the reserved drop ports and to connect a corresponding reserved add port to the destination output port of the switch.

FIG. 1 shows a first implementation in the particular case of a routing node connected to three input optical fibers and three output optical fibers. It comprises the usual routing node components, namely, in succession:

input optical fibers F1-F3 that feed respective input multiplexes WM1-WM3 to input optical amplifiers OA1-OA3;

an input stage IS consisting of optical demultiplexers DM1-DM3 having respective inputs A1-A3 connected to respective outputs of the amplifiers OA1-OA3;

an optical space switch XB, for example a crossbar switch, having inputs P1, . . . Pi, . . . , Pa connected to respective outputs of the demultiplexers DM1-DM3 and outputs Q1, . . . , Qi, . . . , Qa, and which is adapted to connect each output of the demultiplexers selectively to any of its outputs Q1, . . . , Qi, . . . , Qa as a function of a control signal (no reference number);

an output stage OS consisting of optical couplers M1-M3 each having a plurality of inputs and one output, their inputs Q1, . . . , Qi, . . . , Qa being connected to respective outputs XB of the space switch XB and their outputs A'1-A'3 delivering respective output multiplexes WM'1-WM'3; and output optical fibers F'1-F'3 which receive the respective output multiplexes WM'1-WM'3 via output optical amplifiers OA'1-OA'3.

The space switch XB has additional output ports and input ports respectively dedicated to dropping and adding channels reconfigurably. To selectively regenerate any two selected input channels, for example, two drop ports DP1, DP2 and two add ports AD1, AD2 are reserved for this function and regenerator means RG1, RG2 are provided having inputs connected to respective reserved drop ports DP1, DP2 and outputs connected to respective reserved add ports AD1, AD2.

This method provides the required function, but has the disadvantage of a lack of modularity linked to the use of a space switch.

With a view to enhancing modularity, U.S. Pat. No. 6,738,540 describes another type of switch using as its basic element an optical component known as a wavelength selection switch or wavelength switch module and available off the shelf from various suppliers. A description of a component of the above kind can be found in the following document, for example: "The MWS 1×4: A High Performance Wavelength Switching Building Block", T. Ducellier et al., ECOC'2002, Copenhagen, 9 Sep. 2002, document 2.3.1.

This kind of component can be used for demultiplexing or multiplexing according to the signal propagation direction. In the former case, one port of the component constitutes an input and a plurality of other ports constitute outputs. The component can then selectively switch channels of a multiplex received at its input to respective outputs of the module as a function of their respective wavelengths and as a function of a control signal.

The above kind of component therefore provides a programmable demultiplexing function that supplies at any selected output either a selected channel of the received multiplex or an output multiplex consisting of a selected set of channels of the received multiplex. The component providing this function is referred to below as a programmable demultiplexer.

It is able to take into account a large number of received channels but has a small number of outputs, typically four or eight outputs at present. This number can nevertheless be increased by cascading a plurality of these components in a tree structure. A device of the above kind, i.e. a component or an assembly of components equivalent to a component having a greater number of outputs, is referred to below as a programmable demultiplexer module.

The same component can also be adapted to provide the inverse function by interchanging the output and input roles. The channels switched to the output must have different wavelengths, of course. The module then provides a programmable multiplexing function supplying at the output either a selected received channel or an output multiplex consisting of a selected set of received channels. The component providing this function is referred to below as a programmable multiplexer.

Similarly, a device formed of a component or an assembly of components equivalent to a component having a greater number of inputs is referred to below as a programmable multiplexer module.

Thus the patent cited above describes inter alia a switch architecture based on broadcast couplers and programmable multiplexers that is reproduced in FIG. 2, still in the particular instance of three input optical fibers and three output optical fibers.

It comprises in succession:
an input stage BS consisting of broadcast couplers CD1-CD3 each having a respective input A1-A3 and a plurality of outputs;
an output stage SS consisting of programmable multiplexers PM1-PM3 each having a plurality of inputs associated with respective broadcast couplers of the input stage and an output constituting a respective output A'1-A'3 of the switch; and
an interconnection stage connecting each input of the programmable multiplexers of the output stage that is associated with a broadcast coupler to an output of the broadcast coupler associated with that input.

This arrangement selectively switches channels carried by respective wavelengths of multiplex optical signals received at the inputs A1-A3 to respective output ports A'1-A'3 selected as a function of control signals (no reference numbers) applied to the programmable multiplexers PM1-PM3.

To provide the reconfigurable channel dropping function, respective programmable demultiplexers EM1-EM3 are associated with the broadcast couplers CD1-CD3 and each has an input connected to an output of the associated broadcast coupler. Thus it is possible to drop any channels from any input multiplex signal, according to the control signals (no reference numbers) applied to the programmable demultiplexers EM1-EM3.

Finally, to provide the reconfigurable channel adding function, respective combiner couplers AM1-AM3 are associated with the programmable multiplexers PM1-PM3 and each has an output connected to an input of the associated programmable multiplexer. Thus it is possible to add channels at any output port A'1-A'3, according to the control signals (no reference numbers) applied to the programmable multiplexers.

To regenerate input channels selectively, the programmable demultiplexers EM1-EM3 must first switch the channels to be regenerated to outputs of the programmable demultiplexers. The dropped channels must then be routed to processing devices (not shown), the outputs whereof must be selectively connected by the combiner couplers AM1-AM3 to inputs of the programmable multiplexers that lead to the destination output ports A'1-A'3.

This method provides the required function, but has the disadvantage of necessitating a large switching system between the outputs of the programmable demultiplexers EM1-EM3, the processing devices and the inputs of the combiner couplers AM1-AM3.

The invention aims to eliminate the drawbacks of the above solutions by proposing a new optical switch structure that is modular and optimizes the use of its components.

To be more precise, the invention consists in an optical switching device for selectively switching channels carried by respective wavelengths of at least one optical multiplex signal to respective output ports selected as a function of a control signal, this switching device including:
an input stage comprising at least one broadcast module able to provide at a plurality of outputs duplicates of an optical multiplex signal,
an output stage comprising a plurality of programmable multiplexer modules each having inputs associated with respective broadcast modules, the output of each programmable multiplexer module constituting one of said output ports, and
an intermediate stage connecting each programmable multiplexer module input that is associated with a broadcast module to an output of the broadcast module associated with that input, which switching device is characterized in that at least one of said broadcast modules includes a programmable demultiplexer module having at least one transit output and at least one selection output and a star coupler having first and second inputs and n outputs constituting outputs of the broadcast module, a transit output is connected to said first input of the star coupler, and an input and an output of a processing device are respectively connected to a selection output and to said second input of said star coupler.

In the present context the "expression programmable demultiplexer module" refers to an optical device that has one input and a plurality of outputs and switches channels received at its input to respective outputs of this module selectively as a function of their respective wavelengths and as a function of a control signal.

Similarly, a programmable multiplexer module is an optical device that has a plurality of inputs and one output and selectively switches signals received at respective inputs to its output as a function of the wavelengths of the signals received at respective inputs and as a function of a control signal.

This solution has the advantages of enabling modular implementation and minimizing the number of resources reserved for regeneration. In particular, and in contrast to the prior art solutions cited above, its use of couplers enables switching of regenerated signals by the same broadcast and selection means as signals in transit.

The above processing device can apply any kind of local processing to a signal, typically regeneration or substitution of information carried by the signal, retaining the same wavelength.

Moreover, note that each star coupler receives as input either transit channels coming from the transit output or channels that have undergone local processing and, coming from regenerators, for example, can therefore have the required appropriate power. This is not the case for transit channels, however.

It may therefore be beneficial for the transit output of the programmable demultiplexer module to be connected to the first input of the star coupler via an optical amplifier.

Moreover, as shown in FIG. 1, there are normally optical amplifiers on the upstream side of the input ports of the switch. In this case, it is advantageous to use two-stage optical amplifiers and to provide in each of the broadcast modules concerned one of these stages between the transit output of the programmable demultiplexer module and the first input of the star coupler, the other stage being connected to the input of the programmable demultiplexer module.

Nevertheless, the aim is to minimize the use of amplification between the transit output of the programmable demultiplexer module and the first input of the star coupler, or at least to use amplification only for large switches.

A first option is to take into account the fact that, for a star coupler having n output ports and m input ports, the optical losses suffered by each signal in transit through the coupler increase as a function of the larger of the two numbers n and m. To obtain the benefit of complete connectivity, the number n must be at least equal to the number of output ports of the switch. Consequently, optimum use of the coupler, in terms of losses and the number of channels that can be regenerated, is obtained if m is equal to n or at least less than n, for example, provided that the switch is not used to full capacity.

If the optical processing device has a plurality of outputs, another way to minimize the number of inputs of the star coupler, without having to limit the number of channels processed, is for said broadcast module to include a primary coupler having inputs connected to the outputs of the optical processing device and an output connected to an input of the star coupler.

In an embodiment that increases the total number of output ports of the switch, the broadcast module includes p star couplers and the programmable demultiplexer module has p transit outputs connected to respective corresponding inputs of the p star couplers.

The invention also relates to an optical transmission network switching node including a switching device that conforms to the above description.

The invention finally relates to an optical transmission network including at least one such switching node.

Other aspects and advantages of the invention become apparent in the course of the description given with reference to the figures.

FIG. 1, commented on above, represents a routing node including a first prior art switching device.

FIG. 2, commented on above, shows a second prior art switching device.

FIG. 3 shows an optical switching device of the invention.

FIGS. 4 to 6 show embodiments of a broadcast module of the optical switching device of the invention.

FIG. 3 shows one example of the structure of a switching device of the invention, still in the particular case of three input optical fibers and three output optical fibers.

An input stage 1 comprises three broadcast modules MD1-MD3 receiving respective primary multiplex input signals WM1-WM3.

An output stage 2 comprises programmable multiplexer modules OWS1-OWS3 the outputs whereof constitute respective output ports A'1-A'3 of the switching device. The inputs of each multiplexer module are associated with respective different broadcast modules MD1-MD3.

An intermediate stage 3 consists of optical links that couple each input of each programmable multiplexer module to an output of the broadcast module associated with that input.

Each broadcast module MD1-MD3 includes a programmable demultiplexer module IWS1-IWS3 and a star coupler SC1-SC3.

Each programmable demultiplexer module has an input that constitutes one of the input ports A1-A3 of the switching device and a plurality of outputs.

A first output of each programmable demultiplexer module, for example the output B1 of the module IWS1, is connected directly to a first input C1 of the star coupler SC1. Other outputs of each programmable demultiplexer module, for example the outputs B2 and B3 of the module IWS1, are connected to respective inputs of processing devices RG, RG' which are typically regenerators, for example 3R (Reamplification, Reshaping, Resynchronization) regenerators. The outputs of these devices are connected to respective inputs C2 and C3 of the star coupler SC1.

The output B1 is therefore dedicated to transit channels that pass through the switch transparently, i.e. without undergoing any processing or substitution of information. This output B1 is referred to as a transit output and the other outputs B2, B3 are referred to as selection outputs.

Thus the control signals applied to the programmable demultiplexer modules IWS1-IWS3 select the channels to be processed and those which are merely in transit. The control signals applied to the programmable multiplexer modules OWS1-OWS3 allow simultaneous switching of processed channels and transit channels.

As indicated above, the optical losses suffered by the transit channels because of the star coupler are the most critical. The number n of outputs of the coupler is imposed by the nominal number of output fibers to be installed. Thus the star coupler must not have a number of inputs that exceeds this number n.

It is possible to achieve this even if the total number of channels processed becomes high. This situation is represented in FIG. 4, which shows a broadcast module MD1 whose coupler SC1 has only three outputs, whereas the programmable demultiplexer module ISW1 has five outputs.

Here the programmable demultiplexer module ISW1 consists of two programmable demultiplexers (components) WSa and WSb in cascade, the second demultiplexer WSb providing access to a processing device with three components RG1-RG3 for processing three channels. The three outputs S1-S3 of the components RG1-RG3 therefore constitute outputs of the processing device. A primary coupler SC' has inputs E1-E3 respectively connected to the outputs S1-S3 of the elements RG1-RG3 and one output (no reference number) connected to an input of the star coupler SC1.

If the losses are too high despite these measures, an optical amplifier can be inserted between the transit output B1 of the programmable demultiplexer module IWS1 and the first input C1 of the star coupler SC1-SC3.

If amplification is provided on the upstream side of the programmable demultiplexer, it is advantageous to use a two-stage optical amplifier, as in the circuit shown in FIG. 5. The optical amplifier inserted between the transit output B1 and the coupler SC1 then constitutes one stage OA'1 of a two-stage optical amplifier with the other stage OA1 connected to the input of the programmable demultiplexer module IWS1.

FIG. 6 shows a final embodiment that increases the number of output fibers without incurring any power penalty.

The broadcast module MD1 includes two star couplers SC1a, SC1b and the programmable demultiplexer module IWS1 has two transit outputs B1a, B2b respectively connected to corresponding inputs of the two star couplers SC1a, SC1b. The regenerated signals coming from the components RG1 and RG2 are combined before being fed to the star couplers SC1a, SC1b.

On the basis of this example, it is seen that providing two couplers instead of only one doubles the number of output fibers that can be serviced by the broadcast module, at the same time as limiting losses to those caused by couplers with two inputs and two outputs, rather than those caused by couplers with four inputs and four outputs.

In the general case, p star couplers can be provided and the programmable demultiplexer module then has p transit outputs connected to respective corresponding inputs of the p star couplers.

What is claimed is:

1. An optical switching device for selectively switching channels carried by respective wavelengths of at least one optical multiplex signal to respective output ports selected as a function of a control signal, comprising:
   an input stage having at least one broadcast module able to provide at a plurality of outputs duplicates of an optical multiplex signal;
   an output stage comprising a plurality of programmable multiplexer modules each having inputs associated with the at least one broadcast module, the output of each programmable multiplexer module constituting one of said output ports, and
   an intermediate stage connecting each programmable multiplexer module input that is associated with the at least one broadcast module to an output of the at least one broadcast module associated with that input, wherein the at least one broadcast module includes a programmable demultiplexer module having at least one transit output and at least one selection output and a star coupler having first and second inputs and n outputs constituting outputs of the at least one broadcast module, a transit output is connected to said first input of the star coupler, and an input and an output of a processing device are respectively connected to a selection output and to said second input of said star coupler.

2. A switching device according to claim 1, characterized in that said star coupler has at most n inputs.

3. A switching device according to claim 1, characterized in that said optical processing device includes a plurality of additional outputs, said at least one broadcast module includes a primary coupler having inputs connected to said additional outputs of said optical processing device and an output connected to an input of said star coupler.

4. A switching device according to claim 1, characterized in that said transit output of the programmable demultiplexer module is connected to said first input of said star coupler via an optical amplifier.

5. A switching device according to claim 4, characterized in that said optical amplifier constitutes one stage of a two-stage optical amplifier the other stage whereof is connected to the input of said programmable demultiplexer module.

6. A switching device according to claim 1, characterized in that said at least one broadcast module includes p star couplers and said programmable demultiplexer module has p transit outputs respectively connected to corresponding inputs of said p star couplers.

7. A switching node for an optical transmission network including a switching device according to claim 1.

8. An optical switching device for selectively switching channels carried by respective wavelengths of at least one optical multiplex signal to respective output ports selected as a function of a control signal, comprising:
   an input stage having broadcast modules able to provide at a plurality of outputs duplicates of an optical multiplex signal.
   an output stage comprising a plurality of programmable multiplexer modules each having inputs associated with at least one of the broadcast modules, the output of each programmable multiplexer module constituting one of said output ports, and
   an intermediate stage connecting each programmable multiplexer module input that is associated with the broadcast modules to an output of the broadcast modules associated with that input, wherein the broadcast modules includes a programmable demultiplexer module having at least one transit output and at least one selection output and a star coupler having first and second inputs and n outputs constituting outputs of the broadcast modules, a transit output connected to said first input of the star coupler, and an input and an output of a processing device are respectively connected to a selection output and to said second input of said star coupler, wherein said processing applied to a signal consists of regeneration or substitution of information carried by the signal.

9. An optical transmission network, characterized in that it includes at least one switching node according to claim 7.

* * * * *